Nov. 24, 1931.  P. MÖHRING  1,833,088

MUFFLE FURNACE

Filed Aug. 20, 1930   2 Sheets-Sheet 1

Inventor:
PAUL MÖHRING
by Knight Bros.
Attorneys

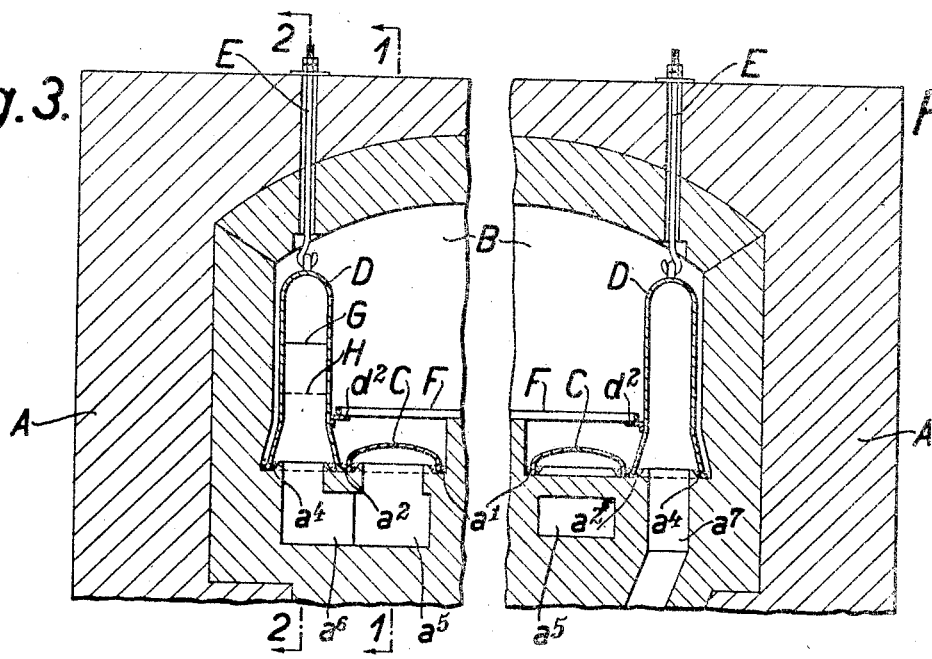
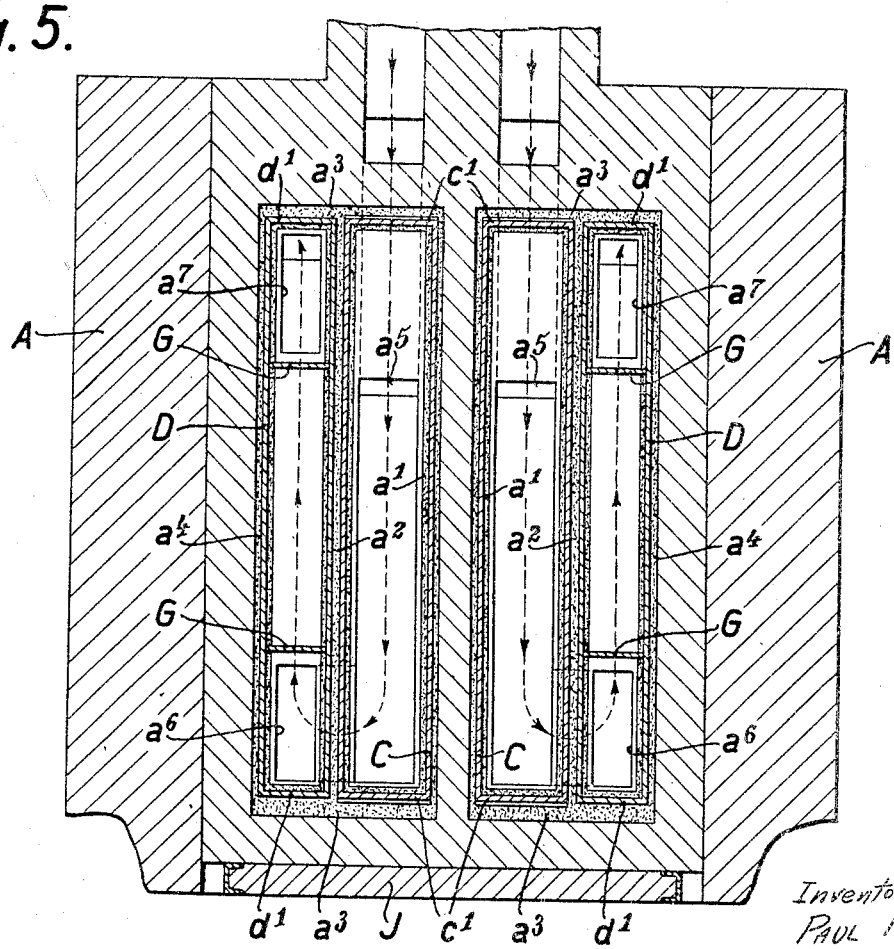

Patented Nov. 24, 1931

1,833,088

UNITED STATES PATENT OFFICE

PAUL MÖHRING, OF ESSEN, GERMANY, ASSIGNOR TO FRIED. KRUPP AKTIENGESELL-SCHAFT, OF ESSEN-ON-THE-RUHR, GERMANY

MUFFLE FURNACE

Application filed August 20, 1930, Serial No. 476,698, and in Germany November 9, 1929.

The invention relates to muffle furnaces for high temperatures in which the space of the muffle is bounded by at least one wall of heat-resisting material, and has for its object to afford very satisfactory tightening of the space of the muffle toward the heating flues of the furnace.

Figure 1:
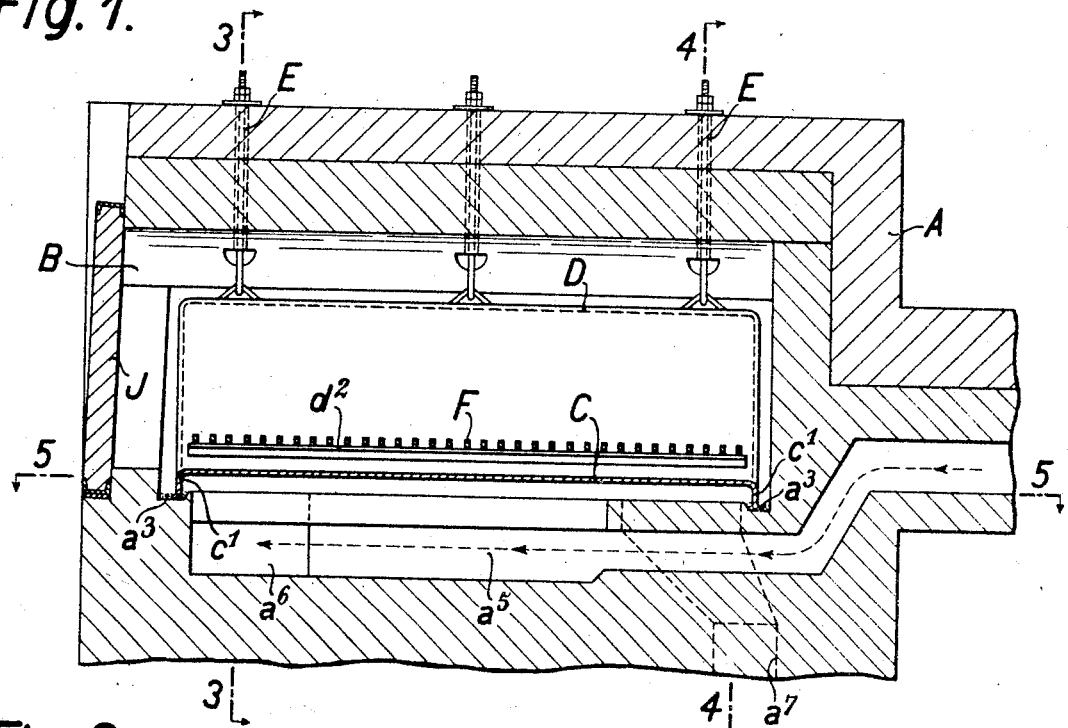
Figure 2:
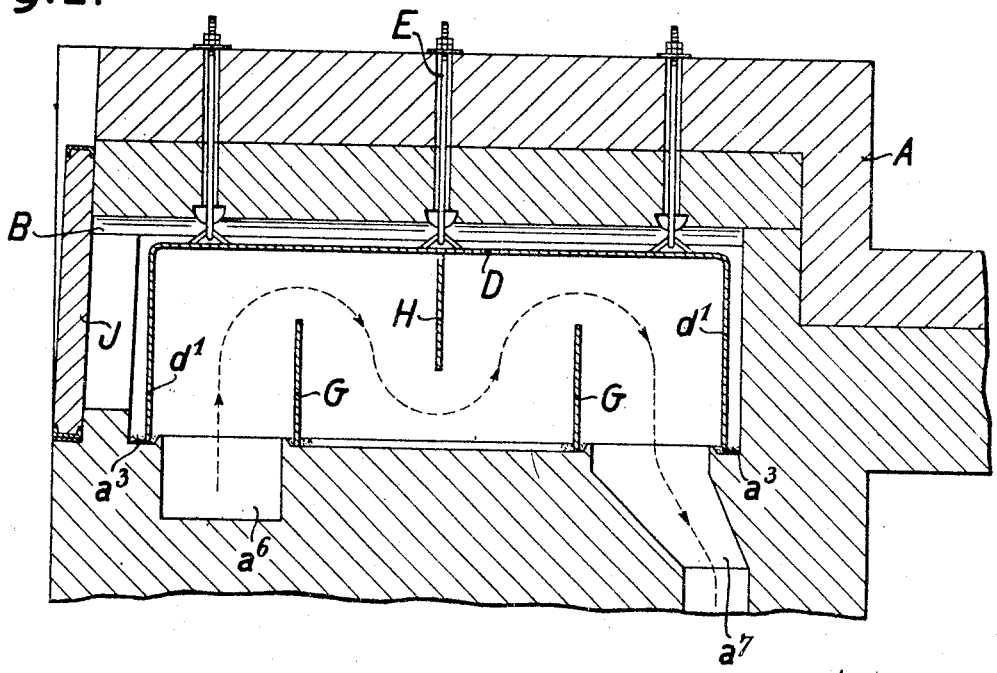

In order that the invention can be more readily understood, an embodiment of the same is illustrated by way of example in the accompanying drawings in which Fig. 1 is a longitudinal section through the furnace, along line 1—1 of Fig. 3 viewed from the right, Fig. 2 is a second longitudinal section through the furnace along line 2—2, likewise viewed from the right, Fig. 3 is a sectional view along line 3—3 of Fig. 1, viewed from the left, Fig 4 is a sectional view along line 4—4 of Fig. 1. also viewed from the left, and Fig. 5 is a horizontal longitudinal section of the furnace along line 5—5 of Fig. 1, viewed from the top.

Referring to the drawings, A denotes the masonry of the furnace and B the muffle. The floor of the muffle B preferably comprises two caps C, each curved in cross section in a three center arch and having end walls $c^1$. The edges of these caps C extend nearly or exactly horizontally and rest in longitudinal grooves $a^1$ and $a^2$ and in transverse grooves $a^3$ provided in the masonry. The longitudinal walls of the muffle are substantially formed each by the inner wall of a heating body D of U-shaped cross section and open on the underside, the ends of which bodies D are closed by front walls $d^1$. The edges of the bodies D extend likewise nearly or exactly horizontally, the inner longitudinal edges resting in the grooves $a^2$ together with the edges of the caps C, while for their outer edges are provided grooves $a^4$ and for the edges of the front walls $d^1$ transverse grooves $a^5$. All of these grooves are filled with a powdered sealing material, such as quartz sand. The heating bodies D are suspended in known manner from the oven cover by means of hook bars E. The heating bodies D have mounted on their inner side angle irons $d^2$ on which rests a grate F whereon the articles to be heated are deposited. Each of the caps C covers a longitudinal open heating flue $a^5$. Each of the heating bodies D, at its front end, covers a flue $a^6$, by which the interior of the heating body communicates with the corresponding longitudinal flue $a^5$, and at its rear end covers an exhaust flue $a^7$. In each body D are provided. in the manner to be seen from Figure 2 baffle plates G and a baffle plate H which cause the heating gases to flow in zigzag. The course of the heating gases is likewise to be seen from Figures 1, 2 and 5 and therefore need not be described in detail, the more so as it is immaterial for the present invention. The door of the furnace is designated by J.

It may be stated that muffle furnaces of the type described are already known in which the side walls of the muffle consist of a heat-resisting metal and the longitudinal edges of these side walls engage grooves of the masonry filled with powdered quartz, while, however the end walls are bricked in the masonry. Now as the masonry and the heat-resisting metal expand in different degree upon the furnace being heated, it is very difficult to permanently keep tight the muffle chamber against the heating flues. As readily to be seen, this drawback is avoided by the described construction.

The idea of the invention of which the embodiment hereinbefore described is only an example, can be realized still in another manner. So, for instance, the heating bodies D can have such a height or such lateral inside extensions that also the roof of the furnace is heated.

What I claim and desire to secure by Letters Patent is:—

1. A muffle furnace having a hollow heating body of heat-resisting metal closed on all sides except the underside and forming at least one wall of the muffle chamber, an open heating flue being provided in the masonry below and covered by, said heating body and an endless groove extending round the aperture of said flue, the lower edge of said heating body resting in said groove and being sand-sealed therein.

2. A muffle furnace having a hollow heating body of heat-resisting metal closed on all sides except the underside and forming at least one wall of the muffle chamber, an open heating flue being provided in the masonry below and covered by, said heating body, an endless groove extending around the aperture of said flue, the lower edge of said heating body resting in said groove and being sand-sealed therein, and means for suspending said heating body from the oven cover.

3. A muffle furnace having a hollow heating body of heat-resisting metal closed on all sides except the underside, and forming at least one wall of the muffle chamber, an open heating flue being provided in the masonry below and covered by, said heating body, at least one other open flue extending along said first-named flue in the masonry, an arched cap covering said other flue, grooves extending round the apertures of said flues, the lower edges of said heating body and of said cap resting, respectively, in said grooves and being sand-sealed therein.

4. A muffle furnace having a hollow heating body of heat-resisting metal closed on all sides except the underside and forming at least one wall of the muffle chamber, an open heating flue being provided in the masonry below and covered by, said heating body, at least one other open flue extending along said first-named flue in the masonry, an arched cap covering said other flue, a common endless groove extending round and between the apertures of said flues, the lower edges of said heating body and of said cap resting in said groove and being sand-sealed therein.

5. A muffle furnace having two hollow heating bodies of heat-resisting metal extending laterally of the furnace so as to form each at least one side wall of the muffle chamber and closed on all sides except the underside, two open heating flues being provided in the masonry below and covered, respectively, by, said heating bodies, two other heating flues extending, respectively, along said first-named flues in the masonry, arched caps each covering said other flues, an endless groove extending round and between the apertures of each of said first-named flues and the adjacent other flue the lower edges of the respective heating body and cap resting in said grooves and being sand-sealed therein.

6. A muffle furnace having a hollow heating body of heat-resisting metal closed on all sides except the underside and forming at least one wall of the muffle chamber, an open heating flue being provided in the masonry below and covered by, said heating body, and endless groove extending round the aperture of said flue, the lower edge of said heating body resting in said groove and being sand-sealed therein, and means fixed on said heating body for depositing thereon the articles to be heat-treated.

The foregoing specification signed at Cologne, Germany, this 6th day of August, 1930.

PAUL MÖHRING.